United States Patent [19]

Graebner

[11] Patent Number: 5,159,833
[45] Date of Patent: Nov. 3, 1992

[54] ANALYZING A HYDROCARBON RESERVOIR BY DETERMINING THE RESPONSE OF THAT RESERVOIR TO TIDAL FORCES

[75] Inventor: Peter Graebner, Santa Ana, Calif.

[73] Assignee: Chevron Research and Technology Company, San Francisco, Calif.

[21] Appl. No.: 623,902

[22] PCT Filed: Jun. 29, 1990

[86] PCT No.: PCT/US90/03743

§ 371 Date: Dec. 24, 1990

§ 102(e) Date: Dec. 24, 1990

[51] Int. Cl.$^5$ .............................................. G01V 9/00
[52] U.S. Cl. ...................................................... 73/155
[58] Field of Search ...................................... 73/155

[56] References Cited

U.S. PATENT DOCUMENTS

| 4,121,464 | 10/1978 | Geiger | 73/382 R |
| 4,244,223 | 1/1981 | Geiger | 73/170 R |
| 5,040,414 | 8/1991 | Graebner | 73/151 |

*Primary Examiner*—Hezron E. Williams
*Assistant Examiner*—Craig Miller
*Attorney, Agent, or Firm*—Ernest A. Schaal; Edward J. Keeling

[57] ABSTRACT

A method is disclosed for determining a component of the response of a reservoir to tidal forces (such as the amplitude of variation or delay time) in a hydrocarbons reservoir. That method comprises measuring a variable responsive to tidal forces within the reservoir over a measurement time period, determining a theoretical earth-tide for the reservoir over that measurement time period, and determining the component of the response to tidal forces by comparing the variable measurements and the theoretical earth-tide determinations. Examples of variables that are responsive to the tidal forces are fluid level in a borehole, pressure, and borehole stress. The measurement time period should be sufficiently long so that both a maximum and a minimum variable measurement are achieved during that time period (e.g., fourteen or twenty-four hours).

1 Claim, 3 Drawing Sheets

ANALYZING A HYDROCARBON RESERVOIR BY DETERMINING THE RESPONSE OF THAT RESERVOIR TO TIDAL FORCES

The present invention relates to a method for deteriming least one component of the response of a hydrocarbon reservoir to tidal forces. With this invention, one can determine the effectiveness of a production operation in a single borehole or in a whole reservoir, or compare reservoir responses at a multitude of boreholes within the same reservoir.

BACKGROUND OF THE INVENTION

The present invention uses a variable previously not used by petroleum geologists—the response of a reservoir to tidal forces.

The word "tide" generally invokes an image of a changing water level at a shoreline, but the moon and the sun also cause tides in the atmosphere, in the solid earth, and in reservoirs within the solid earth. The "earth-tide" is associated with a periodic dilation and constriction of the earth's crust. That dilation and constriction is caused both by the gravitational attraction of the earth to the moon and the sun (other celestial bodies being too far away to appreciably influence the earth) and by the changing weight loads caused by the water tide and atmospheric tide. The present invention is based in part on the fact that hydrocarbon reservoirs respond to this periodic deformation of the earth and to the forces that cause this periodic deformation.

By "earth-tide," we mean the periodic movement in the earth's crust caused by the gravitational attraction of the moon and the sun occuring unequally on different parts of the earth.

By "response of a reservoir to tidal forces," we mean the periodic movement of fluids within a reservoir caused by the same forces that produce the earth-tide at that location. Another name for this response is the "reservoir-tide".

To understand earth-tides and reservoir-tides, consider the sun-earth system and the earth-moon system in isolation, shown in FIGS. 1 and 2.

Referring to FIG. 1, the center of the earth (C) travels at a constant linear velocity in its orbit around the sun. This constant linear velocity is exactly the magnitude required to maintain an orbit. Since both centrifugal force and linear velocity vary proportionally to the distance from the center of rotation, the point (N) on earth nearest the sun has less centrifugal force, and less linear velocity, than at the center of the earth and thus will tend to move toward the sun. The point (F) on the far side of the earth has more centrifugal force, and more linear velocity, and thus will tend to move away from the sun.

Referring to FIG. 2, the earth and the moon rotate about a common axis (A), contained within the earth. A point (N') on the side of the earth nearest the moon experiences a greater gravitational attraction than a point on the common axis. Point N' also experiences an outward normal acceleration due to its rotation about the common axis and this acceleration has a positive component directed toward the moon. A point (F') on the side of the earth farthest from the moon has less gravitational attraction to the moon and has a positive component of centrifugal acceleration directed away from the moon.

Thus the movement of earth in orbit around the sun and the movement of the moon around the earth have similar consequences but for different reasons. Each phenomenon contributes to symmetric bulges on opposite sides of the earth. The observed tidal deformation of the earth is the complex superposition of these two pairs of bulges.

The earth-tide can be observed by the type of standard gravity meter used in hydrocarbon and minerals exploration. Such a gravity meter can define the earth-tide's smooth regularity. The earth-tide's dominant periodicity is approximately twelve hours.

Table A lists the major known components that combine to form the observable earth-tide. Note that the influence of the moon is about twice that of the sun.

TABLE A

| Known components of the earth-tide | | | |
|---|---|---|---|
| Common Symbol | Component Name | Period | Realtive Amplitude |
| $M_2$ | principal lunar | 12.42 hr | 0.454 |
| $S_2$ | principal solar | 12.00 hr | 0.212 |
| $N_2$ | larger lunar elliptic | 12.66 hr | 0.088 |
| $K_2$ | lunisolar | 11.97 hr | 0.058 |
| $K_1$ | lunisolar | 23.93 hr | 0.266 |
| $O_1$ | larger lunar | 25.82 hr | 0.189 |
| $P_1$ | larger solar | 24.07 hr | 0.088 |
| $M_f$ | lunar fortnightly | 13.66 days | 0.078 |
| $S_{sa}$ | solar semi-annual | ½ year | 0.037 |
| | nineteen yearly | 19 years | 0.033 |

Gravity changes are measured in gals (1 gal = 1 cm/sec$^2$). The useful unit for tidal gravity measurements is the microgal, which is one-millionth of a gal. One microgal is roughly one-billionth of the vertical component of the earth's gravity field. The total range of earth-tide induced gravity is within the limits of +300 microgals to −300 microgals.

In shallow aquifers the earth-tide manifests itself as a small periodic rise and fall of the water levels in wells. The relationship between the changing water levels and the changing position of the moon was recognized as early as the first century A.D. by Pliny the Elder. Compared to the minute (a few parts in 10$^8$) dilation or constriction of the earth's crust, the rise and fall of the water level is usually at least a few centimeters. This same effect occurs in hydrocarbon reservoirs.

The observed amplitudes of earth-tide are about twenty percent larger than those predicted from the rigid-earth theory. For a given location, this magnification appears to be a constant and is called the "gravity magnification factor."

The variations in the water-tide also influence the hydrocarbon reservoir. This is because there is more water above the reservoir at high-tide than at low tide.

The variations in the atmospheric tide are difficult to measure because they are much smaller than either the earth-tide or the water-tide, but they also influence the hydrocarbon reservoir. The atmosphere is a load on the surface of the entire earth in the same way that the oceans are loads on the ocean-bottom.

SUMMARY OF THE INVENTION

The present invention is a method for determining a component of the response of a hydrocarbon reservoir to tidal forces. Previously the response of a reservoir to tidal forces was considered as mere "noise" in measurements of the reservoir properties, but we have discovered that this "noise" contains valuable information about the reservoir.

The present invention comprises measuring a variable that is responsive to tidal forces within the reservoir, determining a theoretical earth-tide for the reservoir, and comparing the variable measurements and theoretical earth-tide determinations. Preferably, the measured variable is a pressure measured within the liquid phase of the reservoir.

The measurement time period should be sufficiently long so that there is both a maximum and minimum variable measurement during that time period. Preferably, that time period is at least fourteen hours long.

Examples of possible components of the response to tidal forces include the amplitude of variation of the response, the delay time of the response, and a combination thereof. The amplitude of variation and the delay time of the response to tidal forces can be factored out from the variable measurements to reveal the residual time serials.

A calibrated gravity magnification factor should be used in determining the theoretical earth-tide. That gravity magnification factor is determined by: measuring calibrated gravity at the reservoir over a reference time period, determining a first approximation of the theoretical earth-tide for the reservoir over the reference time period using an arbitrary gravity magnification factor, and determining the calibrated gravity magnification factor for the reservoir by comparing the gravity measurements and first approximation of the theoretical earth-tide determinations.

In one embodiment of the present invention, the effectiveness of a production operation in a given borehole in a reservoir is determined by determining a component of the response of a reservoir to tidal forces both before and after subjecting the reservoir to the production operation and comparing how that component has changed.

In another embodiment, the reservoir properties in at least two different boreholes in the same reservoir are compared by determining the same component of the response of a reservoir to tidal forces at each of the boreholes, and comparing that same component for each of the boreholes.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 1:
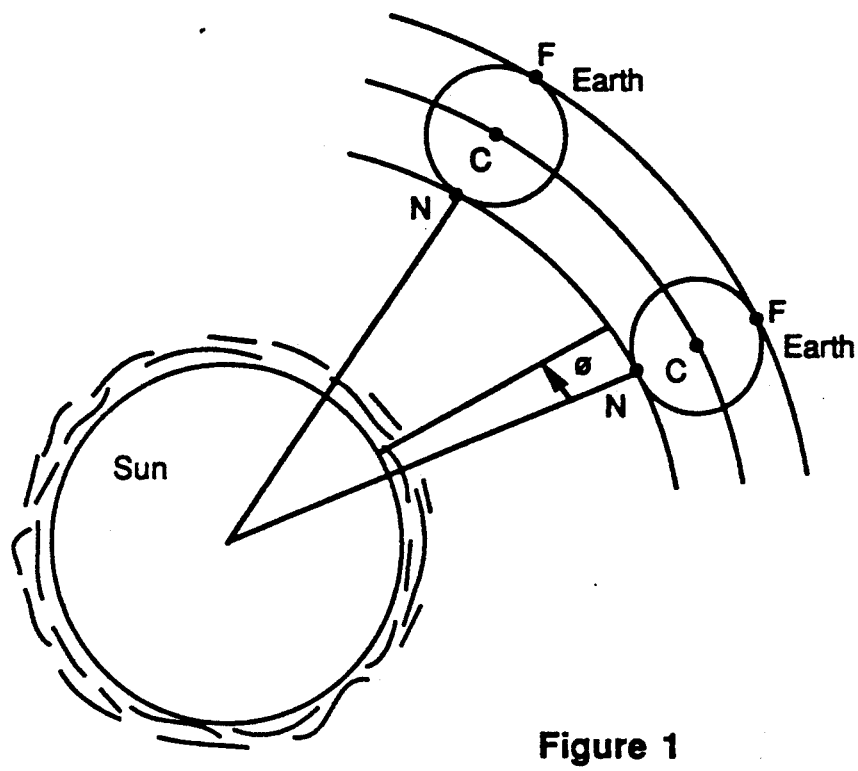
FIG. 1 is a schematic drawing of the Sun-Earth system used to explain the effects of the sun's gravitational forces on the earth.
Figure 2:
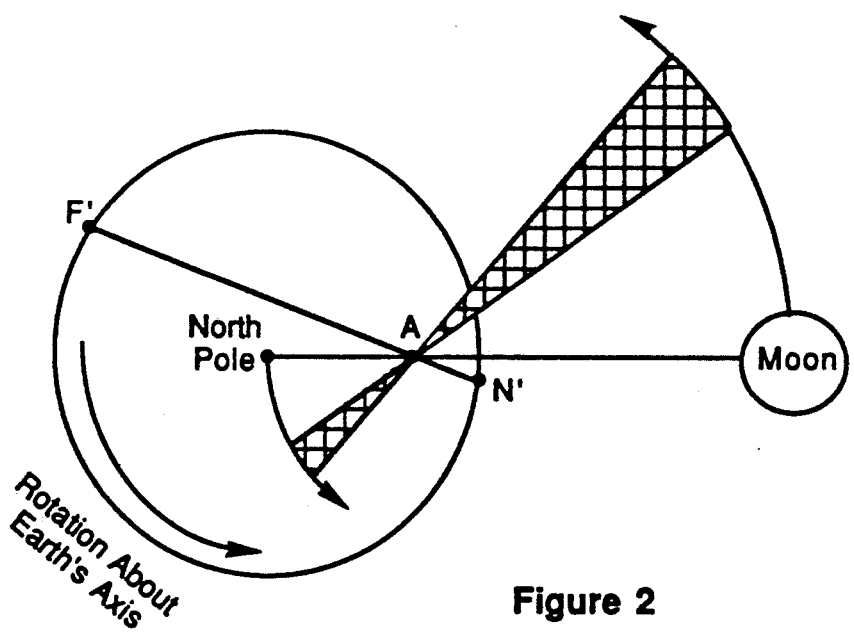
FIG. 2 is a schematic drawing of the Earth-Moon system used to explain the effects of the moon's gravitational forces on the earth.

In its broadest aspect, the present invention is a method for determining a component of the response of a hydrocarbon reservoir to tidal forces. It involves measuring a variable responsive to tidal forces within the reservoir over a measurement time period, determining a theoretical earth-tide for the reservoir over that measurement time period, and determining the component of the response to tidal forces by comparing the variable measurements and the theoretical earth-tide determinations. The response to tidal forces can be used either directly to characterize the reservoir or it can be factored out of the measured signal to reveal the part of the measurement that does not respond to the tidal forces.

THE VARIABLE RESPONSIVE TO TIDAL FORCES

By "variable responsive to tidal forces," we mean a variable that is measurably affected by the tidal forces. There are a variety of these variables, such as fluid level in a borehole, pressure, and borehole stress.

By "fluid level," we mean the instantaneous elevation of the upper surface of the fluid that fills the lower portion of a borehole in the earth. If the fluid level is near the top of the borehole, fluid level can be measured by visual examination. A meter stick could be fastened inside the borehole and the time changes in the fluid level could be noted directly.

Pressure measurements can be used to determine indirectly the rise and fall of the fluid level if the pressure sensor is placed within the fluid. That sensor would be fastened inside the borehole below the lowest fluid level, so that the sensor will be below the fluid level throughout the measurement time. Such pressure measurements offer an indirect means that is more accurate than some direct fluid level measurements.

The preferred method of making pressure measurements is to measure pressure changes instead of total pressure. This can be done by using an apparatus having a reference accumulator that has a reference pressure that represents the environment being measured, and a differential pressure transducer connected to the reference accumulator. The differential pressure transducer measures the difference between the reference pressure and the pressure of the environment being measured.

One possible approach to measuring the horizontal component of the constrictions and dilations of the reservoir in response to tidal forces is by stress measurements within the borehole. These measurements can be made within a cased borehole by measuring changes of the length of a diameter of the borehole casing with time. The circular cross-section of the casing will deform periodically into a variety of elliptical cross-sections in response to tidal forces. The diameter will become shorter in response to a constriction of the reservoir in the horizontal direction parallel with the diameter. Likewise, the diameter will become longer in response to a dilation of the reservoir in the horizontal direction parallel to the diameter.

The resolution of the measurements of the variable responsive to tidal forces might be improved significantly by measuring that variable within a zone of a borehole that is more constrictive than adjacent zones of the borehole. The degree to which fluid-level changes in the borehole are magnified depends upon the inner diameter of the borehole. If the borehole fluid is constrained into a smaller tube, then the amplification becomes greater and the resolution would improve.

In one embodiment, the rising and falling fluid level is forced into a smalldiameter liner within the casing. This liner is also part of the apparatus used to sense the time changes in the fluid level. The liner can be closed at the top to form a pressure vessel. A pressure gauge at the top of the tube would respond to the rise and fall of the fluid level indirectly. Two separated wires could be installed along the inside of the tube throughout its length. The upper surface of the fluid (made at least slightly saline) would provide a short between the wires which would change the resistance to current flowing in a circuit which included the two wires. This change in resistance, manifested as a change in voltage or current, would depend upon the fluid level.

TIME PERIODS

There are two types of time periods used in the present invention. They are measurement time periods and the reference time period. The measurement time periods are the time periods used during which a variable responsive to tidal forces is measured. The reference time period is the time period used during which measurements are made to determine the gravity magnification factor.

Any time period used should be long enough so that it has both a maximum and a minimum variable measurement. By "maximum variable measurement," we mean the highest measurement value of a variable within the time period, if that measurement is both preceded and followed by lower measurements. It roughly corresponds to the top of the earth-tide cycle. By "minimum variable measurement," we mean the lowest measurement value of a variable within the time period, if that measurement is both preceded and followed by higher measurements. It roughly corresponds to the bottom of the earth-tide cycle. If the highest value or lowest value during a time period occurs either at the beginning or end of the time period, it fails to be a true "maximum or minimum variable measurement" because it might not correspond to the top or bottom of the earth-tide cycle.

In the measurement of some variables, instrument drift (i.e., the gradual change in the zero reading of an instrument) might mask the true top and bottom of the earth-tide cycle. In these cases, the time period should be longer than the minimum needed to achieve a true "maximum or minimum variable measurement."

Since the earth-tide's dominant periodicity is about twelve hours, a time period of at least fourteen hours should be adequate. For better results, at least twenty-four hours is preferred. As a general rule, the longer the time period the better.

Preferably, measurements are performed continuously throughout the time period, but some variables are difficult to measure continuously. Those variables can be measured periodically, but they must be measured frequently enough to find maximum and minimum variable measurements that accurately reflect the top and bottom of the earth-tide cycle. For most cases, a sampling time of every fifteen minutes should be adequate.

The reference time period used to determine the gravity magnification factor may start either before, during, or after the measurement time periods. The reference time period and the measurement time period may overlap, be completely separate, or be the same time period.

THEORETICAL EARTH-TIDE

This invention is based in part on being able to determine, the theoretical earth-tide for the reservoir over the measurement time period in order to determine the component of the response to tidal forces. By "theoretical earth-tide," we mean a mathematical simulation of the time variations in the gravity field at a given place and time interval due to the changing relative positions of the sun, moon, and the place of observation on the earth.

The theoretical earth-tide can be calculated from first principles using the ideas advanced in the field of astronomy and in particular the part of astronomy involving celestial mechanics. One way to do this is to follow the steps outlined in I. M. Longman, *Formulas For Computing The Tidal Accelerations Due To The Moon And The Sun*, 64 JOURNAL OF GEOPHYSICAL RESEARCH 12, 2351-2355 (1959).

The earth-tide is computed for a particular location or set of locations at a particular time or set of times. The information required for a computation is comprised of a specification of the locations and times. The specific information is:

1. Latitude of location.
2. Longitude of location.
3. Elevation of location with respect to mean sea level.
4. Time associated with the computed value of the earth-tide.
5. Irregular time adjustments, such as daylight saving time, if appropriate.
6. The gravity magnification factor.

STEPS OF THE COMPUTATION

Figure 3:
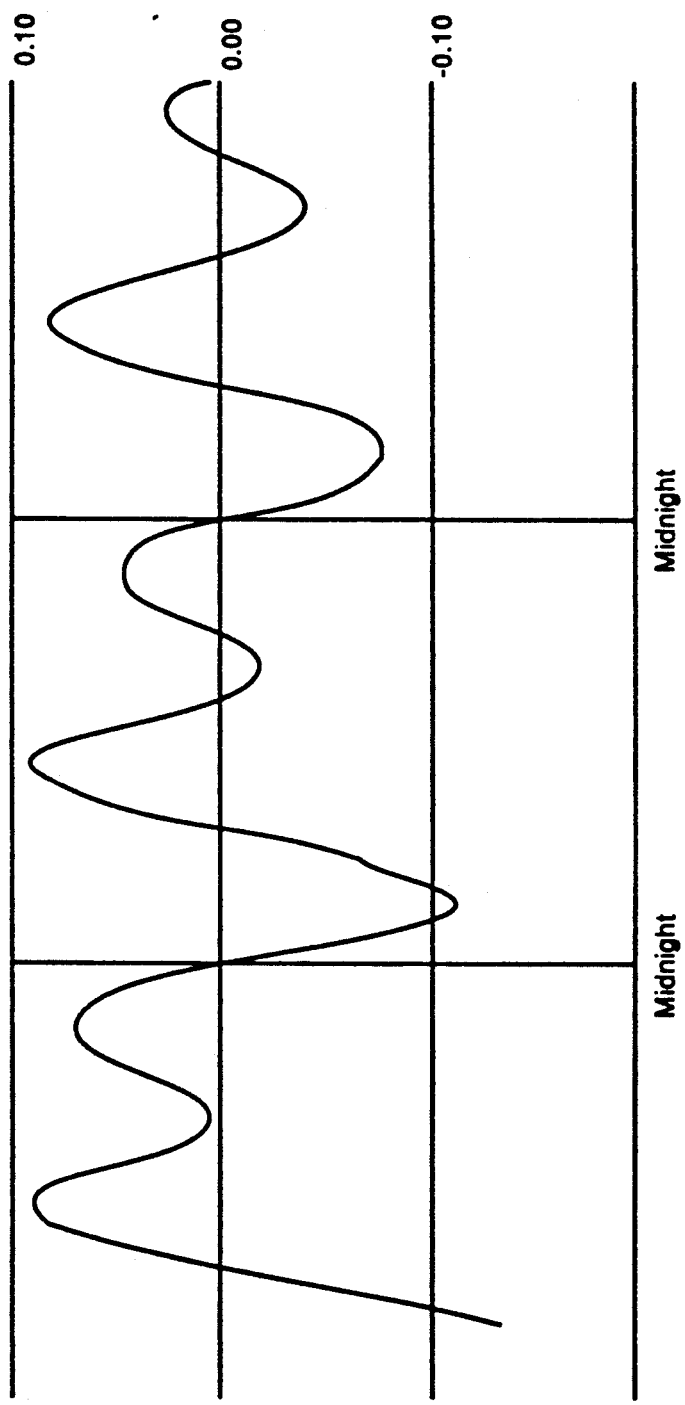
FIG. 3 is a plot of a theoretical earth-tide.

The steps below are outlined in terms of the use of various formulas. They were used to create the theoretical earth-tide graph shown in FIG. 3. Those steps are:

1. Organize input data.
2. Compute the distance between the observation point and the geometric center of an ellipsoidal earth.
3. Compute mean longitude of the moon in its orbit reckoned from the referred equinox.
4. Compute mean longitude of lunar perigee.
5. Compute mean longitude of the sun.
6. Compute longitude of moon's ascending node in its orbit reckoned from the referred equinox.
7. Specify the inclination of the moon's orbit to the equator.
8. Specify the side of the spherical triangle connecting the nodes where the moon's ascending node is one and the ascending intersection of the moon's orbit with the equator is the other. (This side is commonly named "α.")
9. Compute the longitude in the moon's orbit of its ascending intersection with the celestial equator.
10. Compute the mean longitude of the moon in its orbit reckoned from the ascending intersection of the moon's orbit with the equator.
11. Compute the longitude of the moon in orbit reckoned from its ascending intersection with the equator.

12. Compute the longitude of the point on the celestial equator of its intersection with the moon's orbit.
13. Compute the hour angle of the mean sun measured westward from the place of observation.
14. Compute the right ascension of the meridian of the place of observation reckoned from the ascending intersection of the moon's orbit with the equator.
15. Specify the zenith angle of the moon.
16. Compute the reciprocal of the distance between the centers of the earth and the moon.
17. Compute the vertical component (upwards away from center of earth) of the lunar tidal force per unit mass at the place of observation.
18. Compute the eccentricity of the earth's orbit.
19. Compute mean longitude of solar perigee.
20. Compute the longitude of the sun in the ecliptic reckoned from the vernal equinox.
21. Compute the right ascension of the meridian of the place of observation reckoned from the vernal equinox.
22. Specify the zenith angle of the sun.
23. Compute the vertical component (upwards away from center of earth) of the solar tidal force per unit mass at the place of observation.
24. Combine the computed vertical components (steps 17 and 23) with the magnification factor to compute the vertical component of the gravitational attraction at the place of observation due to the moon and the sun.
25. Organize the result of Step 24 with respect to the appropriate sign convention.

High resolution gravity measurements might be used to approximate theoretical earth-tide. In such a method, the variable responsive to tidal forces within the reservoir would be measured over a measurement time period, gravity would be measured in at least one stationary location over that measurement time period, and the component of the response to tidal forces would be determined by comparing the variable measurements and the gravity measurements. Since computed earth-tide values are accurate to about one microgal or slightly better than one microgal, using gravity measurements instead of computed earth-tide values would only be practical if the resolution of those gravity measurements could be improved to less than one microgal.

THE COMPONENT OF THE RESPONSE

Using the variable measurements and the theoretical earth-tide, one can determine at least one component of the reservoir response to tidal forces. By "component of the reservoir response to tidal forces," we mean an independent parameter of the reservoir response to tidal forces. Two components are amplitude of variation and delay time.

Amplitude of Variation

By "amplitude of variation," we mean the amount of change in the measured values that describe the periodic change in the measured variable. The measured values describing the change could be either the direct sensing of the variable or an indirect sensing.

Delay Time

By "delay time," we mean the lag in time between the actual change in the measured variable and the causative constriction and dilation of the reservoir due mostly to the tidal forces.

The "amplitude of variation" and the "delay time" are two distinct parameters determined simultaneously by comparing either the direct or indirect measurements of the values that are responsive to the theoretical earth-tide. The theoretical earth-tide is computed at several discrete times (for example every 15 minutes) for the time period when the actual measurements are made. It is assumed that the magnification factor is known accurately and is accounted for in the computations of the theoretical earth-tide. It is also assumed that the minor influences due to the loading and unloading of the ocean tide and changes in atmospheric presure have been appropriately quantified and removed from the data.

Residual Time Serials

Figure 6:
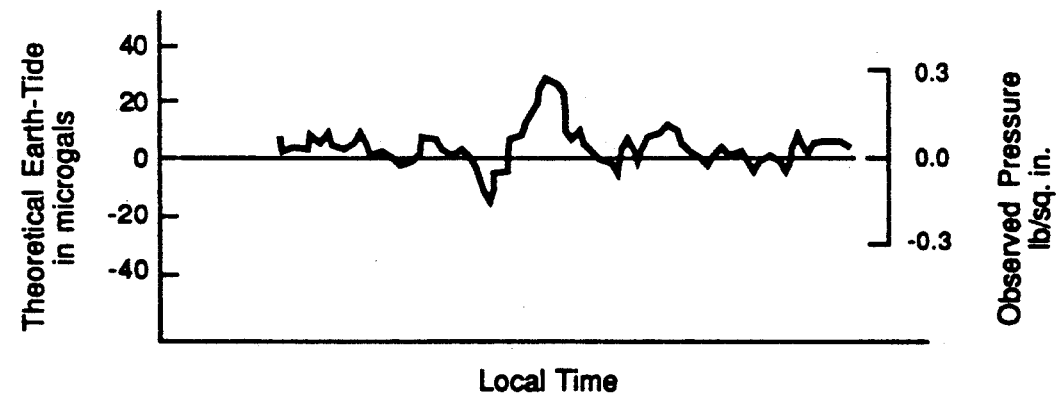
FIG. 6 is a plot of simulated data showing a set of residual time serials as if the amplitude of variations and the delay time had been factored out of the downhole pressure response.

By "residual time serials," we mean the difference between the theoretical earth-tide and the amplitude-adjusted and time-shifted observed data. FIG. 6 illustrates a set of residual time serials.

The Removal Of Atmospheric And Oceanic Effects

The observed response of the measured variable to the tidal forces should be corrected for atmospheric and oceanic effects before the amplitude of variation and delay time are determined.

Over certain time periods, the shape of the earth-tide and ocean-tide signals will display similarities, but over other time periods they will be quite different. The following observations are used to separate the signals:

1. The earth-tide signal is an absolute signal and therefore has an absolute zero value that can be determined with very high accuracy. When the earth-tide effect is zero and instrument drift has been accounted for, the entire observed amplitude is due to the ocean-tide.
2. When the two signals are quite different, it is possible in certain cases, to distinctly observe the influence of one of the components as a superposition of one signal on another.
3. The earth-tide should "lead" to ocean-tide signal in time. If the earth were entirely ocean, the lead would be of the order of 12 minutes. The cause of the delayed ocean-tide effect is usually attributed to friction between the ocean and the sea bottom. The action of the shorelines along continents is to modify the ocean-tide signal. This modification may result in an increased delay but there does not appear to be any physical mechanism that would decrease the delay time.
4. When both the earth-tide signal and the ocean-tide signal are about zero, any difference between the observed relative pressure signal and zero can be attributed to drift, nosie, and a residual signal.

All four observations can be used to establish the separation. The first relationship between the observed residual pressure signal and the observed ocean-height signal. Consider the following relations:

$P_m$ = amplitude of the relative pressure signal in psi
$O_m$ = amplitude of ocean-height signal in feet
$E_m$ = amplitude of earth-tide signal in cm/sec$^2$
$C_p$ = constant shift in amplitude that must be added to every amplitude value of the relative pressure signal in order to establish a zero-signal-level which is consistent with the absolute zero-signal-level of the earth-tide signal in units of psi $C_o$ = constant shift in amplitude that must be added to every amplitude value of the ocean-height signal in order to establish a zero-signal-level which is consistent with the absolute zero-signal-level of the earth-tide signal in units of feet $K_o$ = constant multiplier that tranforms any amplitude value of ocean-height in units of feet into an equivalent value of ocean height in units of pressure—the units of the constant multiplier are psi/feet $K_e$ = constant multiplier that transforms any amplitude value of the absolute earth-tide in units of cm/sec$^2$ an equivalent value of earth-tide in units of pressure—the units of the constant multiplier are psi/cm/sec$^2$ At an arbitrary time, n, the following relationship holds (if instrument drift has been accounted for):

$$P_n + C_p = K_o(O_n + C_o) + K_e E_n$$

At four times when the value of the absolute earth-tide signal, E, is zero (n = 1,2,3, and 4)

$$P_1 + C_p = K_o(O_1 + C_o)$$

$$P_2 + C_p = K_o(O_2 + C_o)$$

$$P_3 + C_p = K_o(O_3 + C_o)$$

$$P_4 + C_p = K_o(O_4 + C_o)$$

These four equations are independent and it is easily shown that:

$$O_2 P_1 + O_1 P_2 = C_p(O_1 - O_2) + C_o(P_2 - P_1)$$

$$O_4 P_3 + O_3 P_4 = C_p(O_3 - O_4) + C_o(P_4 - P_3)$$

These two equations are easily solved for the two unknowns, which are $C_o$ and $C_p$. The solutions are:

$$C_o = \frac{(O_1 - O_2)(O_4 P_3 + O_3 P_4) - (O_3 - O_4)(O_2 P_1 + O_1 P_2)}{(O_1 - O_2)(P_4 - P_3) - (P_2 - P_1)(O_3 - O_4)}$$

$$C_p = \frac{(O_2 P_1 + O_1 P_2) - (P_2 - P_1) C_o}{(O_1 - O_2)} \text{ or,}$$

$$C_p = \frac{(O_4 P_3 + O_3 P_4) - (P_4 - P_3) C_o}{(O_3 - O_4)}$$

The solution for $K_o$ can be obtained using one of four equations above, such as:

$$K_o = \frac{P + C_p}{O + C_o}$$

The solution for $K_e$, at any point in time, m, where E is not zero, is:

$$K_e = \frac{P_m + C_p - K_o(O_m + C_o)}{E_m}$$

With knowledge of $K_o$, $K_e$, $C_p$, and $C_o$ it is now possible to predict $P_m$ at any point in time from measured values of $O_m$ and $E_m$.

$$P_m = K_o(O_m + C_o) + K_e E_m - C_p$$

At any time when $O_m$ is measured, the expression $K_o(O_m + C_o)$ is an estimate of the influence of the ocean-tide on the measured values of $P_m$. This influence can be removed by subtraction.

If there were no noise or coherent signals other than the ocean-tide and earth-tide components, this prediction would be perfect for all times. In practice there is random noise and systematic changes in drift in some situations. Extremely noisy situations may require that the above procedure be carried out in a iterative fashion, where some estimate of drift is assumed and removed. The "best" model of assumed drift might be chosen according to the degree of "fit" between the predicted $P_m$ and the observed $P_m$ for the entire data set.

The technique for removing the influence of the atmospheric effects is subjective because atmospheric variations may be related to both tidal phenomena and weather. Atmospheric pressure should be continuously monitored when $P_m$ is measured. If atmospheric pressure does not seem to vary, the atmospheric influence can be ignored. If atmospheric pressure varies significantly but there are no comparable variations in the appropriate values of $P_m$, the atmospheric influence can be ignored. If there are appreciable changes and the influence is evident in the measured values of $P_m$, where the influence of the ocean-tide has been removed, then a simple technique can be applied to remove the atmospheric effects. That technique comprises the following steps:

1. Select comparable portions of the measured atmospheric pressure values, which include significant variations, and the measured values of $P_m$, where the oceanic influence has been removed and variations similar to the atmospheric variations are evident.
2. If there is a time-delay associated with the values of $P_m$, relative to the times when the atmospheric pressure is measured, adjust the times associated with the measured atmospheric pressure values by adding that constant time delay which produces the best correspondence between values of $P_m$ and measured atmospheric pressure values.
3. Find the constant value that gives best correspondence with measured values of $P_m$ when multiplied by the measured values of atmospheric pressure (which have been adjusted by adding the time-delay, if any). This may require several trials with various constants to determine the best correspondence.
4. Remove the influence of these time-shifted, amplitude adjusted atmospheric pressure values from the appropriate measured values of $P_m$ by subtraction.

EXAMPLES

Figure 4:
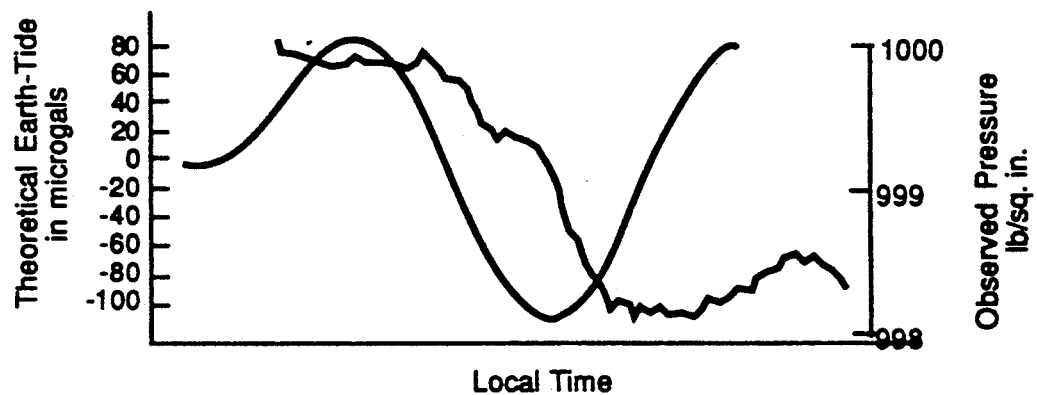
FIG. 4 is a plot of simulated data showing a downhole pressure response and a computed earth-tide response (theoretical earth-tide) appropriate for a reservoir.
Figure 5:
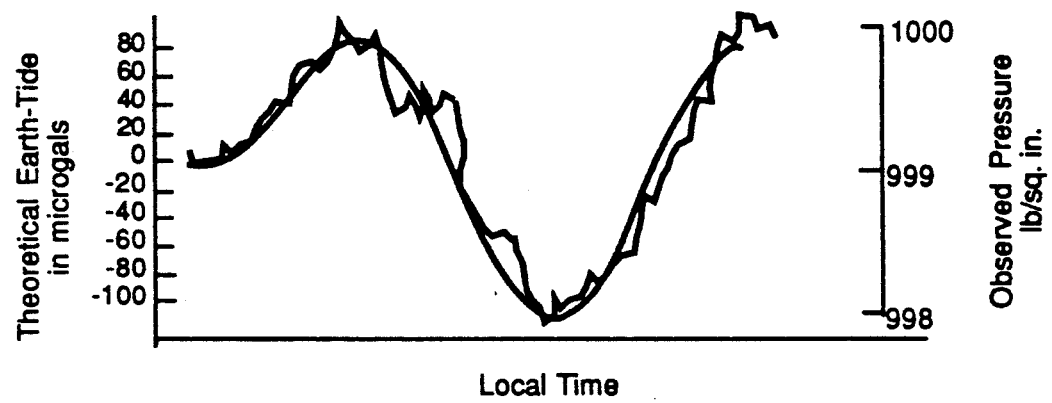
FIG. 5 is a plot of simulated data showing a downhole pressure response as if corrected for instrument drift and as if it has been adjusted in amplitude and delay time to best fit a theoretical earth-tide response.

Referring to FIGS. 4, 5, and 6, those figures show data that are simulations of hypothetical data. The computed theoretical earth-tide response appropriate for the particular reservoir (the smooth line in FIGS. 4 and 5) is the output of the calculations of steps 1 through 25 shown above. Those three figures are intended to illustrate some basic ideas of how these components are determined. Those figures are exemplary only, and should not be construed as limiting the invention.

Measured Downhole Pressure Response (FIG. 4)

The two traces that are plotted in FIG. 4 are:

1. a downhole pressure response (the jagged line), and
2. a computed earth-tide response appropriate for the particular reservoir (the smooth line).

The downhole pressure response shown in FIG. 4 is a simulation of the type of output signal one might receive from a pressure sensor. FIG. 4 indicates that the instrument drift in the measurement is characterized by an apparent decrease in pressure with time.

Corrected pressure response (FIG. 5)

FIG. 5 is derived from the information from FIG. 4 after three simple processing steps have been applied to the measured downhole pressure response. The computed earth-tide response appropriate for the particular reservoir is plotted in FIG. 5 in exactly the same way as in FIG. 4.

The three processing steps are:
1. remove the change in measured downhole pressure response with time due to instrument drift,
2. adjust the amplitude of the measured downhole pressure response in units of pounds per square inch (where the change in measured downhole pressure response due to instrument drift has been removed) to match the amplitude of the compound earth-tide response, and
3. shift the entire measured downhole pressure response along the abscissa (horizontal axis in units of time) to the left.

The magnitude of the change in downhole pressure with time is dependent upon the characteristics of the particular pressure sensor. The amplitude of the downhole pressure response relative to the amplitude of the computed earth-tide response is dependent upon the nature of the response of the reservoir to tidal forces. The magnitude of the shift in time of the entire downhole pressure response is dependent upon the nature of the response of the reservoir to tidal forces.

The amplitude of variation can be determined by comparing the scales on the right and left sides of FIG. 5. The delay time can be determined by magnitude of the shift in time applied to the measured downhole pressure response.

Residual time serials (FIG. 6)

The residual time serials shown in FIG. 6 are derived as the difference between the corrected downhole pressure response from FIG. 5 and the theoretical earth-tide. Note that the time shift that was required to match the responses in FIG. 5 has been augmented by a time shift of the same magnitude in the opposite direction (to the right on FIG. 5). This restoration of the original relationship between the time of observation and the difference between the two responses described above is important because it preserves the appropriate relationship between the response and the time when the response occurred.

USES OF THE PRESENT INVENTION

The uses of determining any of these three parameters (amplitude of variation, delay time, and residual time serials) can be considered in four categories. These categories are:
1. A solitary determination of these parameters at a single borehole.
2. Repeat determinations of these parameters at a single borehole.
3. Solitary determinations of these parameters at each of a set of boreholes in the "same reservoir" (same reservoir includes two or more locations that are even vaguely related).
4. Repeat determinations of these parameters at each of a set of boreholes in the same broadly defined reservoir.

Category One: A solitary determination of these parameters at a single borehole

These parameters for a particular borehole can provide the following diagnostic information:
The absolute amplitude of variations correlates with the volume of reservoir fluid that is in contact with the fluid in the particular borehole.
The delay time correlates with the resistance to fluid flow that is characteristic of the particular borehole.
The residual time serials correlate with the apparent anomalous reservoir behavior that is characteristic of the particular borehole.

By comparing these determinations and all other known determinations of the same component that have been performed anywhere and at anytime in the past, one can make a value judgment about the borehole.

These determinations can be used to derive information about a condition associated with the borehole where action based upon this information might improve production or otherwise gain efficiency.

For instance, either a long delay time or the failure to exhibit an appreciable absolute amplitude of variations could suggest low productivity. The appropriate actions here might be to abandon the exploration borehole or to stimulate the prospective rocks by inducing fracturing in the rocks. On the other hand, a short delay time and an appreciable absolute amplitude of variations might be sufficient to warrant further testing or other action with an exploration well, even if formation testing procedures yielded no indication of hydrocarbons.

The delay time for the borehole could provide a basis for scheduling hydrofracing operations. Hydrofracing may be more effective during times when the hydrocarbon reservoir is being dilated by the tidal forces. The computed value of the earth-tide would be insufficient for such scheduling because of the delay between the force of the earth-tide and the actual movement of reservoir fluid. The delay time also could provide a basis for the scheduling of repetitive injection operations aimed at stimulating production.

If apparent anomalous reservoir behavior is observed due to some interesting feature of the residual time serials, then one might make measurements in nearby boreholes to determine the spatial distribution of the anomalous signal.

Category Two: Repeat determinations of the three parameters at a single borehole The present invention can be used to determine the effectiveness of a production operation in a given borehole in a reservoir. This can be done by determining a component of the response of a reservoir to tidal forces over a first measurement time period, subjecting the reservoir to the production operation after the first measurement time period, determining the same component of the response of the reservoir to tidal forces over a second measurement time period after the beginning of the production operation, and comparing the component of the response of the reservoir to tidal forces for the first and second measurement time periods.

The second measurement time period does not start until the first measurement time period is finished, but the reference time period may occur at any time in respect to the first and second measurement time periods. The production operation may begin at any time, but it must continue after the first measurement time period. The second measurement time period must begin after the beginning of the production operation, but it might overlap the production operation. For instance, the production operation could occur throughout the method.

Examples of production operations useful in the present invention include, but are not limited to: steam injection, water injection, nitrogen injection, carbondioxide injection, chemical injection, production of hydrocarbons, natural gas injection, hydrofracing, and cyclic injection of gases or fluids.

These parameters for a particular borehole can provide the following diagnostic information:
- Differences in the absolute amplitude of variations would reflect the changes in the volumes of fluid in the particular hydrocarbon reservoir that were in contact with the fluid in the particular borehole.
- Differences in the delay times would reflect the changes that have occurred in the resistance to fluid flow in the rocks near the borehole.
- Differences in the residual time serials would reflect changes in apparent anomalous reservoir behavior.

By studying the differences in these parameters that result from the production operation, one can make a value judgment about the effect of that operation.

For instance, a change in the absolute amplitude of variations (which signifies a change in the volume of reservoir fluid in contact with the borehole) could be a consequence of some production operation such as an inequity between the volume of fluid produced and the volume of fluid injected to replace the produced fluid.

A change in the delay time could suggest problems in the borehole environment. An increase in absolute delay time could mean that the effective permeability has decreased. Appropriate action could involve such operations as cleaning the perforations or removing accumulated sand from the borehole.

An increase in absolute amplitude of variation or a decrease in the absolute delay time could reflect a successful production operation, such as an effective realignment of a water flood.

Category Three: Solitary determinations of these parameters at each of a set of boreholes in the same reservoir The present invention can be used for comparing at least one element of a reservoir response to tidal forces of at least two boreholes in a reservoir. This is done by determining the gravity magnification factor for the reservoir, determining at least one element of the reservoir response of each of the boreholes to the tidal forces, and comparing those elements of the reservoir response to tidal forces for each of the boreholes.

Detection of one or more of the three situations described below can provide diagnostic information:
- The detection of specific portions of the reservoir that are anomalous with respect to the degree to which the appropriate boreholes are in contact with a volume of reservoir fluid.
- The detection of specific portions of the reservoir that are anomalous with respect to the degree to which the rocks near the appropriate boreholes suggest resistance to fluid flow.
- The detection of specific portions of the reservoir that are characterized by the same or similar residual time serials and thus exhibit the same or similar anomalous reservoir behavior.

By detecting these situations, one can make a value judgment about the reservoir. For instance, differences among the volumes of fluid in contact with individual boreholes and differences among the resistances to fluid flow could reveal a spatial pattern that could outline large scale reservoir heterogeneity. Based upon this spatial pattern one might alter the spacing of new boreholes, introduce stimulation technology, or alter flooding practices.

Preferred paths for the subsurface transport of injected fluids could be delineated within a hydrocarbon reservoir. One might try to close-off those preferred fluid paths to stimulate production from other portions of the reservoir.

Significant differences in these parameters might reveal whether the feature was a barrier to fluid flow. For example, if the three parameters could be used to establish two distinct groups of boreholes and one group was situated on one side of a major fault and the second group was situated on the other side, then it might be deduced that there was little or no communication across the fault. This is equivalent to saying that the fault is a seal rather than a conduit with respect to fluid flow.

Category Four: Repeat determinations of the three parameters at each of a set of boreholes in the same reservoir The detection of one or more of the three conditions discussed below along with a spatial association of the conditions and a specific portion of the reservoir can be considered as providing diagnostic information:
- The detection of specific portions of the reservoir that display changes with time in the volume of reservoir fluid that is in contact with the fluid in appropriate boreholes.
- The detection of specific portions of the reservoir that display changes with time in the resistance to fluid flow.
- The detection of specific portions of the reservoir that display changes in residual time serials between determinations and thus exhibit changes in anomalous reservoir behavior.

This diagnostic information can be used to deduce the existence of certain problems that are detrimental to hydrocarbon production. Other information may be required to deduce the exact nature of the problem.

If the three conditions are measured in a set of wells before the start of a production operation (such as a steam flood), measurements after the operation has begun might reveal the pattern of spatial influence of the operation throughout the hydrocarbon reservoir. Corrective action could be devised based upon this information that might improve the efficiency of the operation. For example, this action could involve new selections of boreholes for injection.

If a change is made in the implementation of some production operation, corresponding changes in the three conditions among a set of boreholes could offer a measure of the effectiveness of the implementation change.

If production declines in some area in an unexpected manner, then the three measured conditions in this area, compared with areas with normal production, might provide insight concerning the cause of the diminished production.

The compressibility varies among reservoir fluids. Long-term repeat determinations of the three quantities in a number of boreholes in the same oil or gas field might reveal changes that relate to a changing mix of reservoir fluids. Thus the bulk compressibility would change as the mix of gas, oil, brine, and condensate changed and in turn the absolute amplitude of variations, the delay time, and the anomalous reservoir behavior would change. In the absence of other changes, the nature of the reservoir fluid over time could be determined.

MONITORING A RESERVOIR TO DETECT LAND SUBSIDENCE

One cause of land subsidence, in areas where large oil fields have produced for several years, is the non-uniform replacement of produced fluids by injected fluid. This non-uniform replacement shows up as voids within the reservoir, as produced fluids leaves before being replaced with injected fluids. These voids can not support the weight of the earth above them, and thus cause zones within the reservoir to collapse, which causes the ground overlying the reservoir to subside.

The collapse can be described in terms of a loss of "connectivity" within the reservoir. This loss of connectivity can be tracked by observing the corresponding changes in the amplitude of variation and the delay time. As subsidence becomes more severe, the amplitude of variation will diminish and the delay time will increase.

Repeat measurements in selected wells of a reservoir could be performed over the life of a reservoir to maintain a balance between produced and injected fluids. Small gradual changes in amplitude and delay times are expected over the life of a reservoir, due to the differences in physical properties between produced and injected fluids. Large changes in amplitude and delay time reflect significant changes within the reservoir. When large changes are observed, the injection program could be modified by drilling new injection wells or by injecting fluids at greater pressures to bring the reservoir back into balance.

USING "MAN-MADE HYDRAULIC SIGNALS"

The connectivity between wells could be determined by using the fluid component of the hydrocarbon reservoir as a transmission system for the transmission of "man-made hydraulic signals." In one such method, a hydraulic signal is created within at least one well, a variable responsive to tidal forces is measured within at least one other well over a measurement time period, the theoretical earth-tide is determined for the reservoir over that measurement time period, the residual time serials are determined by comparing the variable measurements and the theoretical earth-tide determinations, and the residual time serials are analyzed to determine the amplitude and delay time of receipt of said hydraulic signal.

"Man-made hydraulic signals" can be created by a device that expands or contracts within the fluid column of one borehole. Types of devices that could be used are expanding cylinders and balloons. A seal should be made at some point above the device, but within the fluid column. Below the seal, the fluid is confined and cannot flow upward.

While the present invention has been described with reference to specific embodiments, this application is intended to cover those various changes and substitutions that may be made by those skilled in the art without departing from the spirit and scope of the appended claims.

What is claimed is:

1. A method for determining connectivity between wells within a reservoir comprising:
   (a) creating a hydraulic signal within at least one well;
   (b) measuring a variable responsive to tidal forces within at least one other well within said reservoir over a measurement time period;
   (c) determining a theoretical earth-tide for said reservoir over said measurement time period;
   (d) determining the residual time serials by comparing said variable measurements and said theoretical earth-tide determinations; and
   (e) analyzing said residual time serials to determine the amplitude and delay time of receipt of said hydraulic signal.

* * * * *